United States Patent
Meier et al.

(10) Patent No.: US 6,299,953 B1
(45) Date of Patent: *Oct. 9, 2001

(54) ENCLOSURE ARRANGEMENT FOR FIXING WORKPIECES TO BE PROCESSED AND A PROCESS FOR MANUFACTURING AND SEPARATING THE ENCLOSURE ARRANGEMENT

(75) Inventors: Reinhold Meier, Dorfen; Karl Kerger-Knilling, Munich, both of (DE)

(73) Assignee: MTU Motoren-und Turbinen-Union Muenchen GmbH, Munich (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/064,145
(22) PCT Filed: Aug. 7, 1992
(86) PCT No.: PCT/EP92/01796
  § 371 Date: May 17, 1993
  § 102(e) Date: May 17, 1993
(87) PCT Pub. No.: WO93/05924
  PCT Pub. Date: Apr. 1, 1993

(30) Foreign Application Priority Data

Sep. 18, 1991 (DE) .................................................. 41 30 953

(51) Int. Cl.[7] .................................................. B29D 22/00
(52) U.S. Cl. .................. 428/36.92; 428/36.9; 428/36.91; 428/136; 428/523; 428/163; 428/167; 264/259; 264/279; 264/139; 264/37
(58) Field of Search .......................... 428/36.9, 36.91, 428/36.92, 136, 523, 163, 167; 264/259, 279, 139, 37

(56) References Cited

U.S. PATENT DOCUMENTS

| 3,084,426 | 4/1963 | Hugo et al. | 29/418 |
| 4,737,417 | * 4/1988 | Mushardt et al. | 428/571 |
| 4,827,583 | * 5/1989 | Mushardt et al. | 29/33 R |

FOREIGN PATENT DOCUMENTS

| 2148755 | * 6/1985 | (GB) . |
| 2149328 | * 6/1985 | (GB) . |
| 2166070 | 4/1986 | (GB) . |

* cited by examiner

Primary Examiner—Jose' G. Dees
Assistant Examiner—Michael A. Williamson
(74) Attorney, Agent, or Firm—Crowell & Moring LLP

(57) ABSTRACT

A form-fitting cast-on enclosure arrangement has parallel chucking surfaces for the fixing of metallic workpieces with irregular contours to be processed. A process is provided for the manufacturing and separating of the enclosure arrangement. The enclosure arrangement is made of plastic material and consists of several spaced ribs which are connected by webs. The enclosure arrangement has the advantage that workpieces with irregular contours can be enclosed in a cost-effective and fast manner and can be finished or repaired.

28 Claims, 1 Drawing Sheet

ENCLOSURE ARRANGEMENT FOR FIXING WORKPIECES TO BE PROCESSED AND A PROCESS FOR MANUFACTURING AND SEPARATING THE ENCLOSURE ARRANGEMENT

This application is a 371 of PCT/EP92/01796 filed Aug. 7, 1992.

BACKGROUND AND SUMMARY OF THE INVENTION

The invention relates to a form-fitting cast-on enclosure arrangement having parallel chucking surfaces for the fixing of irregularly contoured metallic workpieces which are to be processed, as well as to a process for manufacturing and separating the enclosure arrangement.

An enclosure arrangement or fixture of the above-mentioned type which is made of metal is known from the Great Britain patent document GB-21 66 070, in which case a metallic high-temperature resistant workpiece with irregular contours, such as a power unit blade, is partially cast into a block of low-melting metal so that in the process parallel chucking surfaces are created and the further processing of the workpiece is therefore made possible. A disadvantage of this fixture is the fact that, during the cast-in operation, molten metal comes in contact with the workpiece surface so that there is at least the risk of contamination of the workpiece surface with foreign metals. In the high-temperature operation of the workpiece, an influencing of the stability characteristics in the area of the cast-on enclosure arrangement of the processed workpiece cannot be excluded. Another disadvantage is the high-expenditure chemical or chemical-physical cleaning of the surface of the workpiece when a contamination is to be removed. Disadvantageously, cracks may occur during the cooling of the molten bath of the enclosure arrangement material. Another disadvantage is the handling of the workpiece that is enclosed by metal because the cast-in block causes a considerable increase in weight. Finally, because of the softness of the low-melting metal with respect to the high-melting hard workpiece, a continuous cutting of the enclosure arrangement material and of the workpiece material is not possible.

In addition, the process known from the Great Britain patent document GB-21 66 070 is not economical, at least for repair work, because a metal melting energy must be applied and a complete metal casting process must be provided. This requires a correspondingly high-expenditure handling of molten baths and long cooling phases.

It is an object of the invention to provide a enclosure arrangement of the above-mentioned type and a process for its manufacturing and separation. In such enclosure arrangement, a common cutting processing of enclosure arrangement material and workpiece material is possible and contamination of enclosure material that does not endanger the workpiece stability is acceptable without any cleaning after treatment. At the same time, however, the contamination is negligibly low. In addition, the enclosure arrangement must be free of material cracks, and the parallel chucking surfaces must permit a secure fixing. It is also an object of the invention to provide a process which is so reasonable with respect to cost that used and damaged components can be fixed by the enclosure arrangement for the purpose of being repaired.

According to the present invention, the object is achieved by the fact that the enclosure arrangement consists of plastic material and has several spaced ribs which are connected by webs.

The enclosure arrangement according to the present invention has the advantage that, at high operating temperatures of the workpiece, plastic material burns in the oxidizing atmosphere so that individual molecule chains which may possibly still contaminate the metallic surface after the processing and separating step, will disintegrate and will not negatively change the stability of the workpiece. Plastic material can easily be handled because of its low specific weight. Using conventional machines, plastic material can be cast onto the workpiece in a few seconds, and the ribbed structure of the parallel chucking surfaces ensures a crack-free casting-on of the enclosure material because plastic material, when it cools from the softened condition, can emit sufficient heat by way of the ribs and webs in order to uniformly cool and shrink. In addition, at room temperature, plastic material still has a sufficient plastic material flowability in order to shrink free of cracks.

The preferred use of a thermoplastic material as the enclosure material results in special advantages. A thermoplastic material can be used several times because it is hard and tough at low temperatures and softens at higher temperatures. This permits an environmentally acceptable enclosure, because approximately up to 100% of the thermoplastic material can be reused without any cost-intensive processing steps.

A preferred material for the enclosure arrangement is polystyrene. This plastic material is hard and solid at room temperature and is capable of enclosing in ribs without any cracks an irregular workpiece contour after a casting-on at the softening temperature and cooling to room temperature. The stability is so high that a chucking of the ribs in conventional fixing tools is possible without any deformations. In addition, this plastic material can be processed in a cutting manner using the same water-cooled tools as the workpiece.

In the case of a first embodiment of the enclosure arrangement, the ribs and the webs have a cross-sectional surface of approximately the same size. This has the advantage that shrinking strains at the transitions points between the ribs and webs are minimized and a crack-free enclosure is permitted.

Another preferred embodiment of the process provides that, between the ribs, the workpiece is completely surrounded by the enclosure arrangement. As a result, on the one hand, the position of the ribs and the webs on the workpiece is additionally secured and, on the other hand, the workpiece can be metal-coated or processed electrochemically or chemical-physically in an advantageous manner on the exposed surfaces that are not covered.

A preferred application of the enclosure arrangement is for the fixing of power unit blades, in which case the webs at least partially enclose the leading edge and the trailing edge of the blade. This results in the advantage that the leading edge and the trailing edge are protected from mechanical damage during the processing operation and, at the same time, the position of the ribs is fixed on the blade.

The ribs are preferably arranged orthogonally or at an angle of between 45° and 90° with respect to the blade axis. The ribs preferably completely enclose the blade. This has the advantage that the blade axis can be aligned more precisely and a secure fixing of the blade device is ensured.

In the case of manufacturing and repair of a power unit blade, the blade is finished first. For this purpose, the blade is chucked in the area of the base or, when a cast-on shroud exists as an integral component, the blade is chucked on the shroud segment. For the finishing of the shroud segment and/or of the blade base, an enclosure is then cast around the blade in order to produce suitable parallel chucking surfaces. A preferred embodiment of the enclosure arrangement therefore provides that the distance between the ribs in the area of the blade base or the blade tip be smaller than in the blade center.

In the blade center, the distance between the ribs is preferably larger than twice the rib thickness. With this arrangement of the ribs, the chucking forces may advantageously be distributed on the blade without the occurrence of deforming chucking forces, particularly since blades in aircraft engines have extremely thin wall thicknesses in the blade center.

A preferred process for manufacturing an enclosure arrangement consists of fitting the workpiece into a receiving mold of an injection molding machine. The plastic material for the enclosure is then injection molded onto the workpiece. This has the advantage that, when polystyrene is used as the enclosure material, the areas to be processed, such as the blade base and the shroud segment, can also be cast in because a water-cooled cutting of both materials is advantageously possible using conventional tools. If the blade is completely surrounded by enclosure material, a cutting may advantageously be followed by a metal plating in the shroud area or in the blade area and/or electrochemical polishing or etching. Chemical-physical processing steps, such as vacuum metallizing or sputtering or chemical vapor depositing are also possible, in which case the finished blade surface is protected by a complete enclosure.

For separating the workpiece from the enclosure, the enclosed workpiece is cooled to a temperature at which continuous shrinking cracks are formed in the enclosure. Since, at low temperatures, the plastic material becomes brittle and shrinks more than the metallic workpiece, continuous shrinking cracks are formed in the plastic material without any deformation of the workpiece. Advantageously, the enclosure chips-off the workpiece without any residues and can be reused in the case of a thermoplastic material and can again be supplied to an injection molding process.

Other objects, advantages and novel features of the present invention will become apparent from the following detailed description of the invention when considered in conjunction with the accompanying drawings.

DETAILED DESCRIPTION OF THE DRAWINGS

Figure 1:
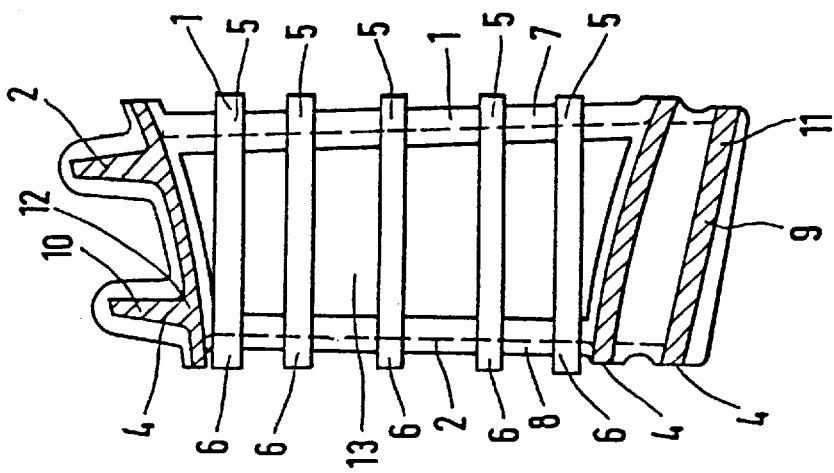
FIG. 1 is a front view of a cast-on enclosure for a workpiece before its finishing according to the present invention.

FIG. 1 illustrates a cast-on enclosure 1 for a workpiece 2 to be processed, such as a blade for gas turbine engines before the finishing. The workpiece 2 has irregular contours. With the exception of a few positioning surfaces 4, the workpiece 2 had been completely surrounded by an injection molding technique with an enclosure material made of plastic material. In this example, the plastic material is polystyrene, a thermoplastic material whose softening temperature is between 80° and 150° C. and which has sufficient stability at room temperature in order to absorb chucking forces by way of chucking surfaces 5 which are arranged in a plane-parallel manner. These chucking surfaces 5 are arranged on ribs 6 which are kept at a distance from one another by webs 7 and 8. This distance decreases in the direction of the surfaces 9 and 10 to be processed. Thus, a secure chucking is ensured in the proximity of the processing areas.

In the case of a blade, the surfaces to be processed are situated in the area of the blade base 11 and in the area of a shroud segment 12. The blade base 11 and the shroud segment 12 are integral components of a blade device. Between these, the blade vane 13 is arranged. The blade vane 13 already has its final contour before the enclosing. In this case, the web 7 at the same time covers the leading edge of the blade vane 13, and the web 8 covers the trailing edge so that the blade vane 13 is protected from mechanical impairment. The cross-sectional surfaces of the webs 7 and 8 have approximately the same size as the cross-sectional surfaces of the ribs 6.

The blade surface between the ribs 6 and the webs 7 and 8 of the enclosure arrangement 1 may also be enclosed by a thin plastic layer. The blade surface will therefore be protected in the case of metalplating steps and/or electrochemical polishing or etching or in the case of chemical-physical process steps, such as vacuum metallizing, sputtering or chemical vapor depositing in the shroud area or in the blade base area.

As in the example shown, the plastic enclosure will then cover the whole blade device with the exception of a few positioning surfaces 4. During the injection molding, the positioning surfaces 4 are kept free of enclosure material in order to, for example, during the milling of plane-parallel surfaces 5, indicate on the ribs 6 of the enclosure 1 suitable reference surfaces for the adjusting of the workpiece 2.

During the finishing, the plastic material of the enclosure arrangement 1 can be cut without any additional special tools together with the workpiece 2 in a water-cooled manner.

Figure 2:
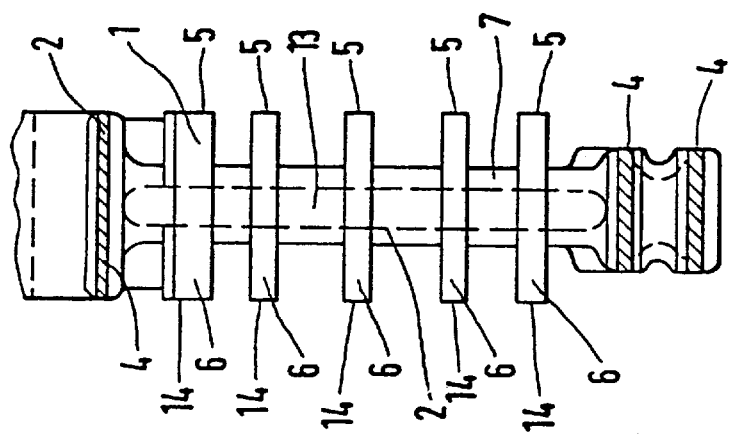
FIG. 2 is a lateral view of a cast-on enclosure of a workpiece according to FIG. 1.

FIG. 2 illustrates a lateral view of a cast-on form-fitting enclosure 1 for a workpiece 2. After the injection molding of the enclosure arrangement 1, forming the ribs 6 and webs 7, the chucking surfaces 5 and 14 on the ribs were milled in a plane-parallel manner after the adjusting with respect to the positioning surfaces 4. This milling step will not be required when the enclosure 1 has precisely positioned plane-parallel chucking surfaces 5 and 14 on the ribs 6 after the injection molding.

Figure 3:
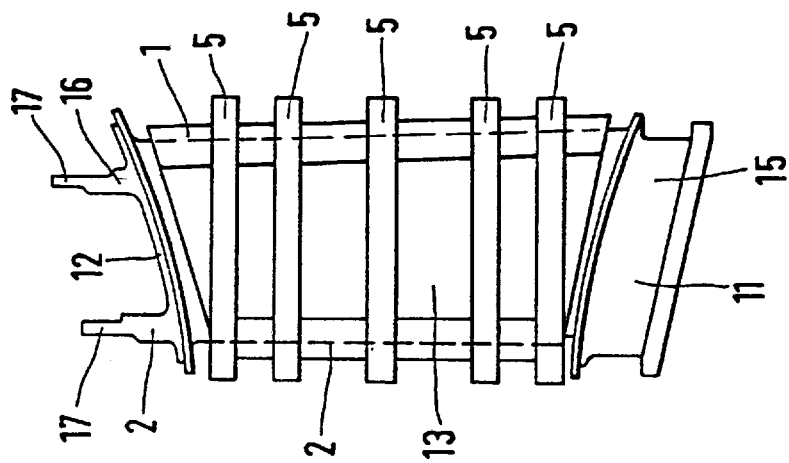
FIG. 3 is a front view of an enclosed workpiece after finishing according to the present invention.

FIG. 3 shows an enclosed workpiece 2 after finishing. In this case, together with the finishing of the lower 15 and upper 16 workpiece areas, the enclosure 1 made of plastic material was also worked off. In the case of the finishing of a blade device, the blade base 11 and a shroud segment 12 with sealing tips 17 were processed in geometrical reference to the chucking surface 5 so that the enclosure 1 with its plane-parallel chucking surfaces 5 has stopped in the area of the blade vane 13. Using a cooling operation, the remainder of the enclosure 1 is separated from the blade vane 13 after the finishing. For this purpose, the enclosed workpiece 1 is cooled to a temperature at which continuous shrinking cracks are formed in the enclosure and the enclosure 1 chips off the workpiece 2 in fragments without any residue 2.

The manufacturing of a form-fitting enclosure 1 in the injection molding operation according to the invention requires only seconds. Likewise, the no-residue separating of the enclosure 1 from the workpiece 2 by means of a cooling step also requires only seconds. The plastic fragments obtained from the separation step can be reused. Thus, this enclosure arrangement 1 makes available a cost-effective device which permits processing steps on workpieces 2 with irregular contours and repairs of such workpieces 2 in a cost-effective and fast manner. The invention even allows the implementation of repair work in an economical fashion.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A form-fitting cast-on enclosure for fixing an irregularly contoured metal workpiece to be processed, the enclosure comprising:

at least three spaced apart ribs extending across each of substantially opposite surfaces of the workpiece, said ribs on each of the surfaces forming respective chucking surfaces, the chucking surfaces being substantially parallel to one another;

at least two webs, each of which respectively connects same-side ends of said ribs; and wherein said ribs and webs have cross-sectional surfaces of approximately the same size, and consist only of polystyrene.

2. The enclosure according to claim 1, further comprising a thin polystyrene layer extending between the spaced apart ribs over the surfaces of the workpiece so as to substantially enclose the surfaces.

3. The enclosure according to claim 1, wherein areas between the spaced apart ribs over each surface of the workpiece are devoid of any enclosure material.

4. The enclosure according to claim 1, wherein the spaced apart distance between the ribs in a central area of the workpiece is greater than: the distance between the ribs away from the central area of the workpiece, or the distance between a respective rib and workpiece end surface.

5. The enclosure according to claim 4, wherein the spaced apart distance between the ribs in the central area of the workpiece is at least twice a rib thickness.

6. The enclosure according to claim 1, wherein the spaced apart distance between the ribs in a central area of the workpiece is at least twice a rib thickness.

7. The enclosure according to claim 1, wherein the at least three spaced apart ribs are arranged at angles of between 45° and 90° with respect to a longitudinal axis of the workpiece.

8. The enclosure according to claim 7, wherein the at least three ribs are arranged substantially parallel to one another.

9. A form-fitting cast-on enclosure for fixing a power unit blade device having a blade vane with a leading edge, a trailing edge, a convex surface, a concave surface, a blade base, a blade tip and a longitudinal blade axis extending in the direction from the blade base to the blade tip, the enclosure comprising:

at least three spaced apart ribs extending across each of the convex and concave surfaces of the blade vane, said ribs on each surface forming respective chucking surfaces, the chucking surfaces on the convex surface being substantially parallel to those on the concave surface;

at least two webs, each of which connect respective same-side ends of said ribs; and wherein said ribs and webs have cross-sectional surfaces of approximately the same size, and consist only of polystyrene.

10. The enclosure according to claim 9, further comprising a thin polystyrene layer interconnecting the ribs over each of the convex and concave surfaces so as to substantially enclose the blade vane.

11. The enclosure according to claim 9, wherein areas between the spaced apart ribs over the convex and concave surfaces are devoid of any enclosure material.

12. The enclosure according to claim 9, wherein the spaced apart distance between the ribs in a central area of the blade vane is greater than: the distance between the ribs away from the central area of the blade vane, or the distance between a respective rib and the blade base or blade tip.

13. The enclosure according to claim 12, wherein the spaced apart distance between the ribs in the central area of the blade vane is at least twice a rib thickness.

14. The enclosure according to claim 9, wherein the spaced apart distance between the ribs in a central area of the blade vane is at least twice a rib thickness.

15. The enclosure according to claim 9, wherein the at least three spaced apart ribs are arranged at angles of between 45° and 90° with respect to the longitudinal blade axis.

16. The enclosure according to claim 15, wherein the at least three ribs are arranged substantially parallel to one another.

17. The enclosure according to claim 16, wherein each web encloses a substantial portion of either the leading edge or trailing edge of the blade vane.

18. The enclosure according to claim 9, wherein each web encloses a substantial portion of either the leading edge or trailing edge of the blade vane.

19. A process for manufacturing an enclosure arrangement for fixing an irregularly contoured metal workpiece to be processed, the process comprising the acts of:

arranging the workpiece into a receiving mold of an injection molding apparatus; and injection molding only polystyrene, onto the workpiece, said molded polystyrene forming the enclosure having parallel chucking surfaces, and said molded polystyrene being substantially reusable.

20. The process according to claim 19, wherein the act of injection molding further comprises the acts of:

forming at least three spaced apart ribs extending across each of substantially opposite surfaces of the workpiece, portions of said ribs forming the respective parallel chucking surfaces; and forming at least two webs, each of which respectively connects same-side ends of said ribs.

21. The process according to claim 20, wherein the spaced apart distance between the ribs in a central area of the workpiece is greater than: the distance between the ribs away from the central area of the workpiece, or the distance between a respective rib and workpiece end surface.

22. The process according to claim 21, wherein the spaced apart distance between the ribs in the central area of the workpiece is at least twice a rib thickness.

23. The process according to claim 20, wherein the spaced apart distance between the ribs in a central area of the workpiece is at least twice a rib thickness.

24. The process according to claim 20, wherein the at least three spaced apart ribs are arranged at angles of between 45° and 90° with respect to a longitudinal axis of the workpiece.

25. The process according to claim 24, wherein the at least three ribs are arranged substantially parallel to one another.

26. The process according to claim 19, further comprising the act of separating the polystyrene from the workpiece by cooling the workpiece to a temperature at which continuous shrinkage cracks form in the polystyrene.

27. The process according to claim 20, wherein the acts of forming the ribs and webs further comprise the act of forming said ribs and webs with cross-sectional surfaces of approximately the same size.

28. A form-fitting cast-on enclosure arrangement having parallel chucking surfaces for fixing irregularly contoured workpieces to be processed, the enclosure arrangement consisting of only polystyrene shaped in the form of several spaced apart ribs extending across a surface of a workpiece and being connected at respective ends via webs.

* * * * *